(12) United States Patent
Ching et al.

(10) Patent No.: US 12,104,090 B2
(45) Date of Patent: *Oct. 1, 2024

(54) SELECTIVELY MELTABLE ADHESIVES FOR BONDING OF DEICERS

(71) Applicant: Goodrich Corporation, Charlotte, NC (US)

(72) Inventors: Nathaniel Ching, Hartville, OH (US); Jin Hu, Hudson, OH (US); Peter J. Walsh, Wethersfield, CT (US); Casey Slane, Tallmadge, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,810

(22) Filed: Mar. 6, 2023

(65) Prior Publication Data
US 2023/0234712 A1    Jul. 27, 2023

Related U.S. Application Data

(62) Division of application No. 16/595,771, filed on Oct. 8, 2019, now Pat. No. 11,623,753.

(60) Provisional application No. 62/790,639, filed on Jan. 10, 2019, provisional application No. 62/780,312, filed on Dec. 16, 2018.

(51) Int. Cl.
| | |
|---|---|
| C09J 11/04 | (2006.01) |
| B64D 15/00 | (2006.01) |
| B64D 15/12 | (2006.01) |
| C08K 3/08 | (2006.01) |
| C08K 3/22 | (2006.01) |
| C09J 5/06 | (2006.01) |
| C09J 7/38 | (2018.01) |
| C09J 9/02 | (2006.01) |
| B64D 33/02 | (2006.01) |
| B82Y 30/00 | (2011.01) |
| C08K 7/04 | (2006.01) |
| C09J 9/00 | (2006.01) |
| C09J 109/02 | (2006.01) |
| C09J 123/08 | (2006.01) |
| C09J 175/04 | (2006.01) |

(52) U.S. Cl.
CPC .............. *C09J 11/04* (2013.01); *B64D 15/00* (2013.01); *B64D 15/12* (2013.01); *C08K 3/08* (2013.01); *C08K 3/22* (2013.01); *C09J 5/06* (2013.01); *C09J 7/385* (2018.01); *C09J 9/02* (2013.01); *B64D 2033/0233* (2013.01); *B82Y 30/00* (2013.01); *C08K 2003/0856* (2013.01); *C08K 2003/2265* (2013.01); *C08K 7/04* (2013.01); *C08K 2201/001* (2013.01); *C08K 2201/011* (2013.01); *C09J 7/38* (2018.01); *C09J 9/00* (2013.01); *C09J 109/02* (2013.01); *C09J 123/0853* (2013.01); *C09J 175/04* (2013.01); *C09J 2203/35* (2020.08); *C09J 2301/502* (2020.08)

(58) Field of Classification Search
CPC ......... C09J 2301/502; C08K 203/2268; C08K 203/2272; C08K 203/2275
See application file for complete search history.

(56) References Cited

U.S. PATENT DOCUMENTS

| | | | |
|---|---|---|---|
| 5,340,863 A * | 8/1994 | Krutzel | C09J 123/08 |
| | | | 524/270 |
| 7,407,704 B2 | 8/2008 | Kirsten | |
| 11,623,753 B2* | 4/2023 | Ching | C09J 7/385 |
| | | | 244/134 R |
| 2010/0213189 A1 | 8/2010 | Keite-Telgenbuescher et al. | |
| 2014/0014640 A1 | 1/2014 | Calder et al. | |
| 2014/0034231 A1 | 2/2014 | Schubert et al. | |
| 2014/0151353 A1 | 6/2014 | Steinwandel et al. | |
| 2016/0284449 A1 | 9/2016 | Haq et al. | |
| 2017/0044053 A1* | 2/2017 | Schuh | B32B 7/06 |
| 2017/0198116 A1* | 7/2017 | Wu | C08K 3/22 |
| 2017/0347492 A1 | 11/2017 | Cola et al. | |
| 2019/0118523 A1 | 4/2019 | Chiang et al. | |

FOREIGN PATENT DOCUMENTS

| | | |
|---|---|---|
| CN | 104087224 B | 6/2016 |
| CN | 108928074 A | 12/2018 |
| EP | 2499204 A1 | 9/2012 |
| EP | 3287276 A1 * | 2/2018 |
| RO | 129561 A2 * | 6/2014 |
| WO | 2017022420 A1 | 2/2017 |
| WO | 2017154885 A1 | 9/2017 |
| WO | WO 2020/021168 A1 * | 1/2020 |

OTHER PUBLICATIONS

Machine translation of RO 129561 (no date).*
Machine translation of WO 2020/021168 (no date).*
Discussion of modulus as it relates to time and temperature taken from https://chem.libretexts.org/Bookshelves/Organic_Chemistry/Polymer_Chemistry_(Schaller)/04%3A_Polymer_Properties/4.09%3A_Modulus_Temperature_Time.*
Communication Pursuant to Article 94(3) EPC for EP Application No. 19216500.9, Dated May 12, 2021, pp. 6.

(Continued)

*Primary Examiner* — Marc S Zimmer
(74) *Attorney, Agent, or Firm* — Kinney & Lange, P. A.

(57) ABSTRACT

A method of making an adhesive for an ice protection assembly includes mixing ferrous nanoparticles into the adhesive. Removal of the adhesive for ice protection assembly inspection or repair includes heating the ferrous nanoparticles in the adhesive to soften the adhesive and allow for easy removal or repositioning of the ice protection assembly.

20 Claims, 5 Drawing Sheets

(56) References Cited

OTHER PUBLICATIONS

Extended European Search Report for EP Application No. 19216500.9, Dated Apr. 30, 2020, pp. 8.

Information regarding the density characteristic of carbon black obtained at https://www.flexicon.com/Materials-Handled/Carbon-Black.html#:-:text=This%2Oresidue%20is%20then%20collected,area%2Dto%2Dvolume%2Oratio. (no date).

* cited by examiner

SELECTIVELY MELTABLE ADHESIVES FOR BONDING OF DEICERS

CROSS-REFERENCE TO RELATED APPLICATION(S)

This application is a divisional of U.S. patent application Ser. No. 16/595,771 filed Oct. 8, 2019 for "SELECTIVELY MELTABLE ADHESIVES FOR BONDING OF DEICERS," which in turn claims the benefit of U.S. Provisional Application No. 62/790,639 filed Jan. 10, 2019 for "SELECTIVELY MELTABLE ADHESIVES FOR BONDING OF DEICERS," which in turn claims the benefit of U.S. Provisional Application No. 62/780,312 filed Dec. 16, 2018 for "SELECTIVELY MELTABLE ADHESIVES FOR BONDING OF DEICERS," are hereby incorporated by reference in their entirety.

BACKGROUND

This application relates generally to ice protection assemblies, and specifically to ice protection assembly adhesives.

An aircraft moving through the air is often subjected to ice formation, and anti-icing or de-icing devices must be used to remove or prevent ice from accumulating on exterior surfaces of the aircraft. Ice protection assemblies, such as pneumatic and electrothermal elastomeric ice protection devices, are often attached to wing leading edges or other aircraft components with adhesive.

Both pneumatic and electrothermal elastomeric ice protection devices must be removed and re-applied during the lifetime of the part on which they prevent ice formation, or repositioned if initial installation on the surfaces is not aligned properly. Typically, ice protection devices are attached to aircraft component with chemical adhesives that require extensive preparation, application, and drying time. De-bonding these chemical adhesives, or pressure sensitive adhesives used to secure ice protection devices to aircraft components for reapplying or repositioning ice protection assembly, is time consuming and can damage the ice protection device. Additionally, traditional "fast application" or "quick removal" adhesives lack the strength necessary to secure an ice protection device to an aircraft component surface.

SUMMARY

In one embodiment, a method of preparing an adhesive includes infiltrating the adhesive with nanoparticles. The nanoparticles are ferrous particles.

In another embodiment, a method of making an ice protection assembly includes providing an aircraft component having a surface, applying an adhesive on the surface of the aircraft component, wherein the adhesive is loaded with nanoparticles, and attaching, by the adhesive, a heater attached to the aircraft component. The nanoparticles are ferrous particles.

In yet another embodiment, a method of removing an adhesive from a component includes running microwave radiation through the adhesive so that nanoparticles in the adhesive heat and soften the adhesive and removing the softened adhesive. The nanoparticles are ferrous particles.

DETAILED DESCRIPTION

Disclosed is an adhesive loaded with ferrous nanoparticles that allow for easier removal of that adhesive between an ice protection assembly and an aircraft component for reapplying or repositioning the ice protection assembly. An adhesive loaded with microwave responsive nanoparticles, such as ferrous nanoparticles, will soften or melt when exposed to RF or microwave radiation. Nanoparticles can be readily loaded into thermoplastic adhesives including pressure sensitive adhesives, which can in turn be used to attach ice protection devices to aircraft components. The use of nanoparticles in an adhesive also enhances the strength of the adhesive; the nanoparticles act as a reinforcing phase in a composite while the adhesive is the matrix. This strengthens the bond between the ice protection assembly and the aircraft component, allowing lower strength materials to be used for the adhesive.

Figure 1A:
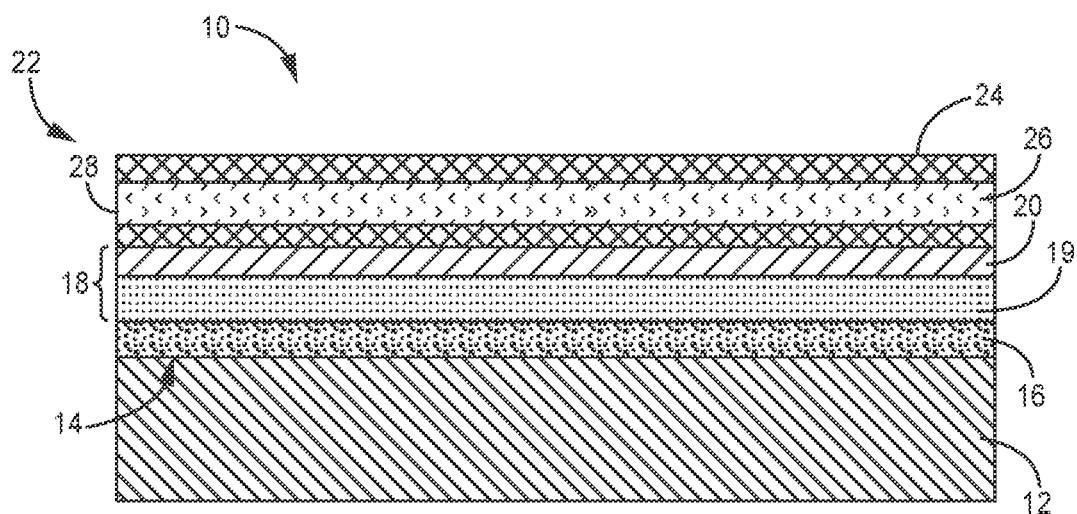
FIG. 1A is a schematic diagram of an ice protection assembly attached to an aircraft component with a ferrous nanoparticle loaded pressure sensitive adhesive.

FIG. 1A is a schematic diagram of ice protection assembly 10 attached to an aircraft component 12 with a nanoparticle loaded pressure sensitive adhesive. Assembly 10 includes aircraft component 12 with surface 14, primer 16, nanoparticle loaded adhesive 18 (with pressure sensitive adhesive 19 and nanoparticles 20), and heater 22. Heater 22 includes structural layers 24, heating element 26, and electrical connections 28.

Aircraft component 12 with surface 14 is a component needing ice protection. Component 12 can be, for example, an airfoil, nacelle, nosecone, engine cowl, or other aircraft part. Surface 14 is the surface that requires ice protection, on which the ice protection assembly is attached through ferrous nanoparticle loaded adhesive 18.

Nanoparticle loaded adhesive 18 has two components: pressure sensitive adhesive (PSA) 19 and ferrous nanoparticles 20. PSA 19 is an adhesive which forms a bond when pressure is applied to the adhesive and the components it is adhering. Pressure sensitive adhesives are frequently used with adhere ice protection devices to aircraft components, and typically have a thickness of about 10 mils. Examples of suitable materials for PSA 19 include acrylates, silicones, nitriles, and styrenes, for instance, pn VHB 9473 by 3M.

Figure 1B:
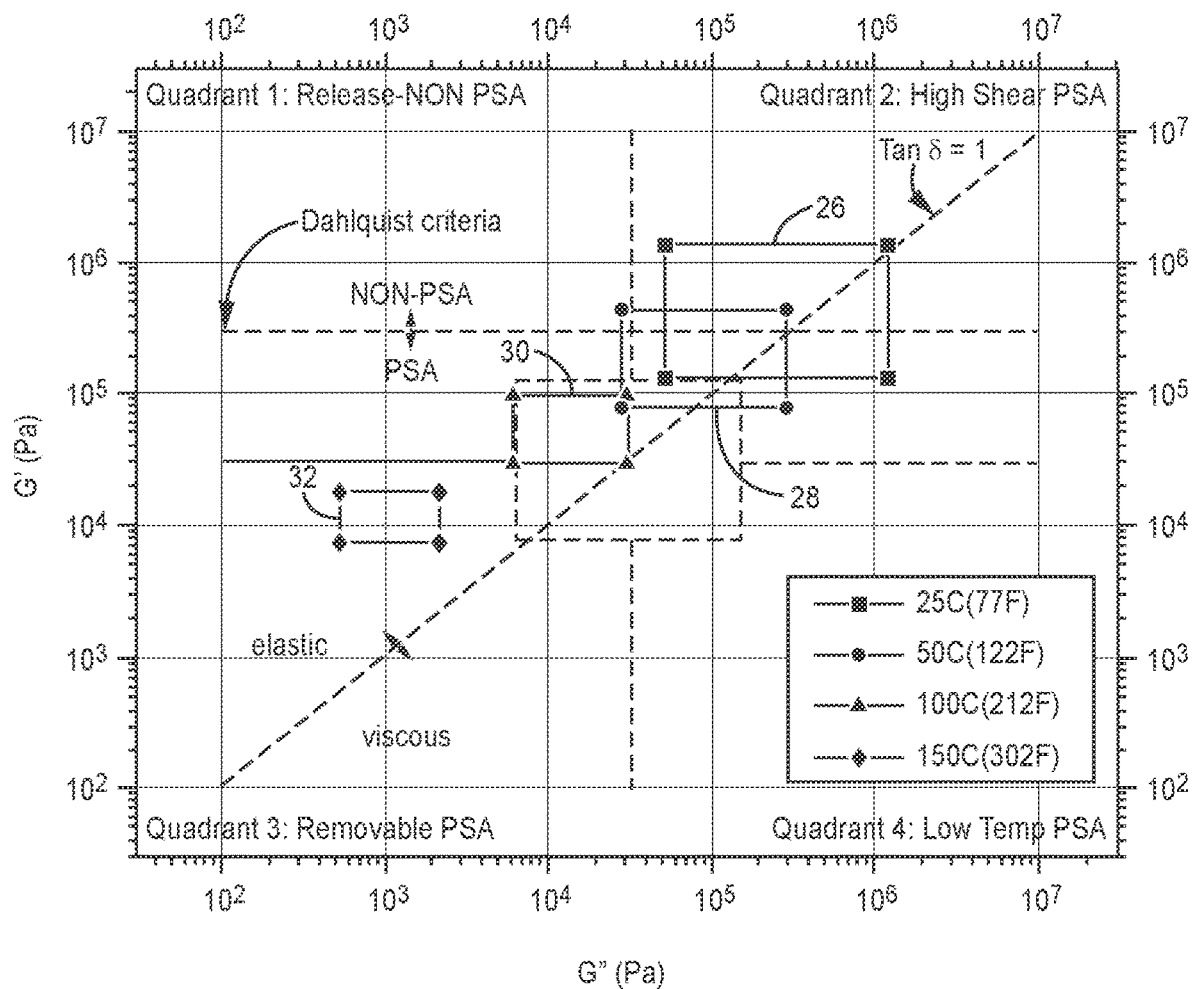
FIG. 1B is a Chang plot of one embodiment of a thermally switchable high shear pressure sensitive adhesive according to the present disclosure.

FIG. 1B is a Chang plot of one non-limiting example of thermally switchable PSA 19. The Chang plot is constructed in accordance with the method described in Chang, E. P., (J. of Adhesion v. 34 (1-4) (1991) pp. 189-200) to establish PSA viscoelastic windows 26, 28, 30, 32. The viscoelastic windows are constructed from values of dynamic storage or elastic modulus G' and dynamic loss modulus G", both measured in pascal (Pa), at an angular frequency of 0.01 radians per second (rad/s) and 100 rad/s. The storage modulus G' represents the elastic deformation of the material and is a measure of the stored energy. The loss modulus G" represents the viscous portion of the material and is a measure of the energy dissipated as heat. Low frequency testing characterizes bond formation, while high frequency testing characterizes debonding behavior and peel strength.

Each viscoelastic window is produced by plotting values of (1) G' at 0.01 rad/s, G" at 0.01 rad/s (lower left corner), (2) G' at 100 rad/s, G" at 0.01 rad/s (upper left corner), (3) G' at 0.01 rad/s, G" at 100 rad/s (lower right corner), and (4) G' at 100 rad/s, G" at 100 rad/s (upper right corner) on a logarithmic scale vertical ordinate of G' and a logarithmic scale horizontal ordinate of G". The location of each viscoelastic window, and particularly the locations of the low frequency storage and loss moduli G' and G" (lower left corner of the viscoelastic window) and the high frequency storage and loss moduli G' and G" (upper right corner of the viscoelastic window), can determine the adhesion performance of PSA 19. As illustrated in FIG. 1B, the position of the viscoelastic window within four defined quadrants can be used to identify non-PSA or release coatings (quadrant 1), high shear PSAs (quadrant 2), removable PSAs (quadrant 3), and quick stick and low temperature PSAs (quadrant 4), as described further herein.

Quadrant 1 is defined to be above a horizontal line at a G' value of 30,000 Pa and to the left of a vertical line at a G" value of 32,000 Pa. PSAs in quadrant 1 have a high storage modulus G' and a low loss modulus G". If the viscoelastic window is within quadrant 1, the material is rubbery, has a high storage modulus and does not dissipate energy. The overall behavior is that of a non-PSA or release film (i.e. the material will be unlikely to stick to a surface and will debond easily).

Quadrant 2 is defined to be above a horizontal line at a G' value of 30,000 Pa and to the right of a vertical line at a G" value of 32,000 Pa. PSAs in quadrant 2 have high storage and loss moduli G' and G". If the viscoelastic window is within quadrant 2, the material will have high cohesive strength due to the high storage modulus G' and high dissipation due to high loss modulus G". The overall behavior is that of a strong high shear PSA. As long as the low frequency G' is below the Dahlquist criterion of $3 \times 10^5$ Pa at the temperature of application (usually about 25° C.), the PSA will be tacky and stick easily to the substrate surface.

Quadrant 3 is defined to be below a horizontal line at a G' value of 30,000 Pa and to the left of a vertical line at a G" value of 32,000 Pa. PSAs in Quadrant 2 have low storage and loss moduli G' and G". If the viscoelastic window is within quadrant 3, the material is a soft, highly viscous fluid. The material will stick well to a surface because the storage modulus G' is well below the Dahlquist criterion, and will not have much strength. Because the loss modulus G" is also low, materials with a viscoelastic window in quadrant 3 will not dissipate much energy when peeled. The resulting behavior is an easily removable PSA.

Quadrant 4 is defined to be below a horizontal line at a G' value of 30,000 Pa and to the right of a vertical line at a G" value of 32,000 Pa. PSAs in Quadrant 4 have a low storage modulus G' and a high loss modulus G". If the viscoelastic window is within quadrant 4, the material is a pressure sensitive adhesive capable of operating at very low temperatures. Because the loss modulus G" is high, materials with a viscoelastic window in quadrant 4 will have a high dissipation. Coupled with a low storage modulus G', the resulting behavior is a material that can stick with short contact time and at low temperatures.

A central area is defined as a box bounded by an upper horizontal line at a G' value of 130,000 Pa, a lower horizontal line at a G' value of 8,000 Pa and a pair of vertical lines at G" values of 6,500 Pa and 150,000 Pa. The central area is characterized by medium storage and loss moduli G' and G". If the viscoelastic window is within this central area, the material behaves as a middle of the road or general purpose PSA.

The Dahlquist criteria line is defined as a horizontal line at a G' value of 300,000 Pa as illustrated in FIG. 1B. The Dahlquist criteria indicates the ability of a material to adhere to a surface with contact. For good tack, the lower left hand corner storage modulus G' of the viscoelastic window (i.e., G' at 0.01 rad/s, corresponding to a timescale used to apply the PSA to a surface) must fall below the Dahlquist criteria line. Tan δ is defined as the ratio of G" to G'. On the Chang plot, the diagonal tan δ=1 line separates the region in which the storage modulus G' is greater than the loss modulus G" from the region in which the storage modulus G' is less than the loss modulus G". The portion of the viscoelastic window to the left of the tan δ=1 line indicates elastic material characteristics, which provide better removability due to an increased likelihood of adhesive failure. The portion of the viscoelastic window to the right of the tan δ=1 line indicates viscous material characteristics and materials prone to cohesive failure (e.g., can leave a residue upon removal).

With PSA 19, the strength of the adhesive bond depends on the viscoelastic properties of the PSA. In this case, PSA 19 can be further designed to have high shear strength over a service temperature range, such that PSA 19 will not fail due a change in temperature within the service temperature range during operation. For aircraft deicer applications, the service temperature can generally range from −40° F. to 160° F. (−40° C. to 71° C.). For deicing applications, PSA 19 has high frequency storage and loss moduli G' and G" located in quadrant 2 of the Chang plot within a range of G' values greater than 30,000 Pa and G" values greater than 32,000 Pa across the service temperature range. Preferably, the high frequency storage modulus G' will be above 130,000 Pa and the high frequency loss modulus G" will be above 32,000 Pa across the service temperature range.

For good tack upon installation, the lower left corner storage modulus G' (low frequency storage modulus G') is less than the Dahlquist criteria at 25° C. (temperature at which the PSA is applied).

Additional factors affecting surface 14 affect the strength of adhesion. For instance, smoothness, surface energy, removal of contaminants, and other factors affect proper adhesion. For this reason, primer 16 is coated on surface 14 of component 12 to prepare surface 14 for application of ferrous nanoparticle loaded adhesive 18. Primer 16 promotes adhesion between component surface 14 and PSA 19. Primer 16 can be, for example, pn 94 available from 3M. Primer 16 is applied evenly throughout component surface 14, and can be applied by spraying, painting, wiping, or other appropriate methods.

PSA 19 is "loaded" with nanoparticles. These can be, for example, ferrous nanoparticles (also referred to as iron oxide nanoparticles). Ferrous nanoparticles are inorganic nanoparticles classified based on the size of the iron oxide. These particles can range from 50 microns to 5 nm. Ferrous particles have superparamagnetic properties, a form of magnetism where magnetization can randomly flip direction under the influence of temperature. Associated properties of ferrous particles include controllable size, large surface area-to-volume ratio, and nontoxicity. Ferrous nanoparticles include both magnetite and maghemite forms. Applications of ferrous nanoparticles include catalysis, sensors, superparamagnetic relaxometry, and high-sensitivity biomolecular magnetic resonance imaging for medical diagnosis and therapeutics. Ferrous nanoparticles can be supplied from Sigma Aldrich or similar chemical distributors.

Other types of nanoparticles can be used to "load" PSA 19. For example, silica core or steel nanoparticles. Typically, the nanoparticles should have diameters of between 50 micron and 5 nanometers, and comprise between 5% to 25% by volume of the PSA 19 to prevent degradation of the PSA adhesive strength due to over saturation of nanoparticles.

In the context of PSA 19, ferrous particles will respond to and align with an alternating electromagnetic radiation, such as radio frequency (RF) or microwaves. When the magnetic field is varied, the particles' movement will heat up the adhesive, allowing the adhesive to soften or melt.

Electrically conductive nanowires may be used instead of ferrous particles. Nanowires are several nanometers in diameter and several hundred nanometers to several millimeters long. Carbon nanotubes and steel nanowires are examples. The electrically conductive nanowires need to be subjected to an alternating electromagnetic field. The electromagnetic field will induce an electrical current in the nanowires, and the nanowires will heat because of their resistance.

Nanoparticles will respond to electromagnetic radiation $\lambda$ between 1 mm and 10 km, although higher and lower wavelengths may be used at the tradeoff of lower efficiency or higher interference. Also, addition of nanoparticles to a composite does not substantially change the overall thickness of that composite. For example, if a standard 0.10" PSA layer is used as an adhesive, the addition of nanoparticles would not alter that thickness.

Nanoparticle loaded adhesive 18 is prepared by infiltrating PSA 19 with nanoparticles 20. Typically, this can be done by mixing the nanoparticles into the PSA when the PSA is being manufactured or prepared. Particles should be comprise between 5% to 25% by volume of the PSA 19. More than 25% by volume of the nanoparticles could potentially make PSA 19 too stiff.

When applied, nanoparticles 20 will micro-scale infiltrate PSA 19 at the micron scale (from a tenth to tens of microns). Nanoparticles should be evenly added to PSA 19 to avoid uneven melting when nanoparticle loaded adhesive 18 is later de-bonded for reapplication or repositioning of ice protection devices. Generally, particles should be less than 25% by volume of particle loaded adhesive 18 so as not to interfere with the integrity and adhesive strength of PSA 19.

Heater 22 is an ice-protection device for an aircraft component. Heater 22 contains structural layers 24, heating element 26, and electrical connections 28. Heater 22 is designed to prevent ice formation on an aircraft component surface. In heater 22, heating element 26 can be a metallic or carbon nanotube heating element supported by structural layers 24 and connected to a power source via electrical connections 28. Heater 22 is one example of an ice protection device. Alternatively, heater 22 can be instead a pneumatic de-icer, a different version of an electrothermal de-icer, or other ice protection devices.

Heater 22 is adhered to surface 14 via nanoparticle loaded adhesive 18. After adhesive 18 and heater 22 with aircraft component surface 14, adhesive 18 is wetted out as necessary to create the adhesive bond. This can be, for example, wetting out of the PSA 19 with a roller, by hand, or by other methods known to those in the art.

When heater 22 needs to be removed from aircraft component 12 (for instance, for repair or inspection or reposition), nanoparticle loaded adhesive 18 can be melted and heater 22 can be peeled off from aircraft component 12. In this case, nanoparticle loaded adhesive 18 is placed in range of to a microwave or RF radiation source. microwave or RF radiation is applied to nanoparticle loaded adhesive 18, and nanoparticles 20 make the adhesive 18 heat and subsequently soften or melt. This weakens the bond strength of PSA 19, allowing for nanoparticle loaded adhesive 18 to de-bonded and heater 22 to be separated from aircraft component 12.

Figure 2:
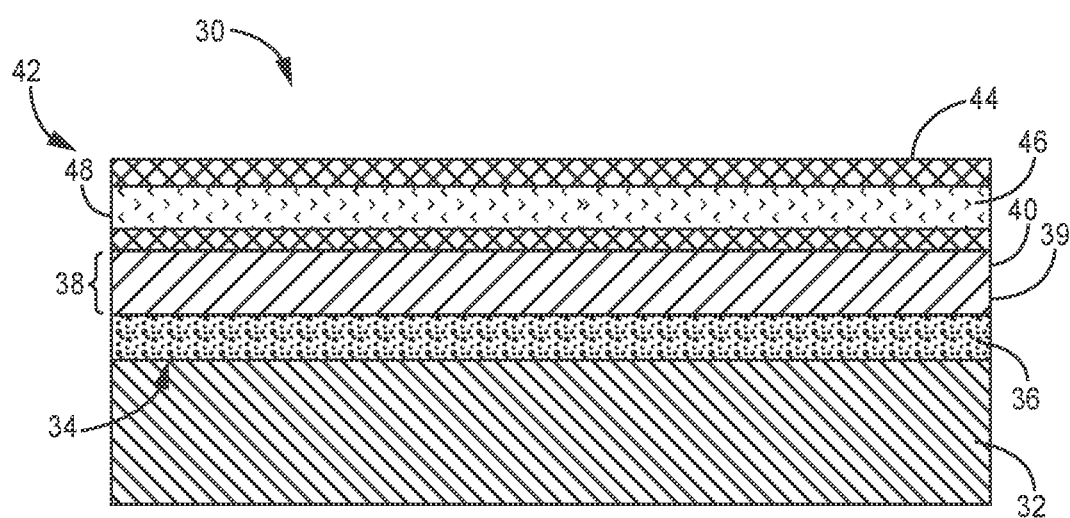
FIG. 2 is a schematic diagram is a schematic diagram of an ice protection assembly attached to an aircraft component with a ferrous nanoparticle loaded thermoplastic adhesive.

FIG. 2 is a schematic diagram is a schematic diagram of ice protection assembly 30 attached to aircraft component 32 with a nanoparticle loaded dry thermoplastic adhesive. Ice protection assembly 30 includes aircraft component 32 with surface 34, primer 36, nanoparticle loaded adhesive 38 (with dry thermoplastic adhesive 39 and ferrous nanoparticles 40), and heater 42. Assembly 30 is similar to assembly 10 in FIG. 1. As such, only differing components will be discussed in depth.

In assembly 30, nanoparticle loaded adhesive 38 contains a thermoplastic adhesive 39 and nanoparticles 40. Thermoplastic adhesives are polymer-based adhesives that melt when they are heated. Examples of thermoplastic adhesives includes ethylene vinyl acetate (EVA), polyolefin, polycarbonate, acrylonitrile butadiene styrene (ABS), and polyurethane. Nanoparticles 40 can be mixed into thermoplastic adhesive 39 during initial preparation of thermoplastic adhesive 39. The nanoparticles 40 should not be more than 50% by weight of the adhesive 38 to maintain the integrity and strength of thermoplastic adhesive 39. A heater 42 with thermoplastic adhesive 38 is applied to the aircraft by using a RF or microwave radiation source to heat the adhesive.

Figure 3A:
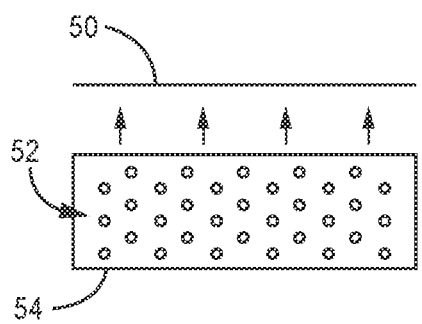
FIGS. 3A-3C are schematic diagrams of nanoparticle infiltration of an adhesive.
Figure 3B:
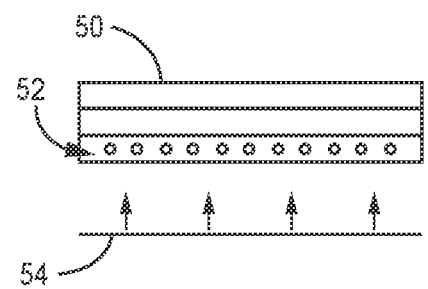
Figure 3C:
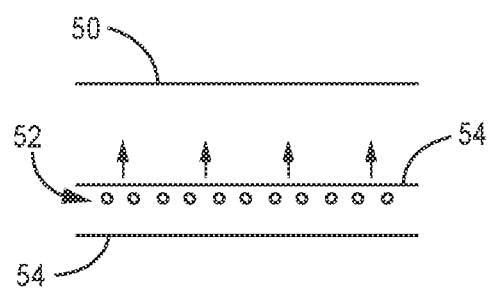

FIGS. 3A-3C are schematic diagrams of nanoparticle infiltration of an adhesive. FIGS. 3A-3F show de-icer 50, nanoparticles 52, and adhesive 54. De-icer 50 is a pneumatic boot or propeller de-icer to which adhesive 54 will be applied. Nanoparticles 52, as described with reference to FIG. 1, are vertically aligned carbon nanotubes infiltrating adhesive 54. Adhesive 54 can be, for example, a pressure sensitive adhesive as described with reference to FIG. 1, or a thermoplastic adhesive as described with reference to FIG. 2.

FIG. 3A shows adhesive 54 pre-loaded with nanoparticles 52 prior to application onto de-icer 50. As discussed earlier, the nanoparticles 52 can be loaded into adhesive 54 by normal methods as known in the art. Alternatively, FIG. 3B shows an assembly where de-icer 50 is loaded with nanoparticles 52 instead of the adhesive 54. In this case, nanoparticles 52 are applied to de-icer 50 on its outermost layer, so that after application of adhesive 54 the nanoparticles 52 can micro-infiltrate the adhesive 54. FIG. 3C shows a third embodiment, where nanoparticles 52 are located between two layers of adhesive 54 instead of on an outer surface.

Figure 4:
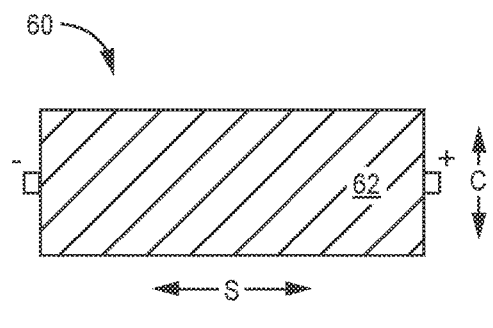
FIGS. 4-6 are schematic diagrams of nanoparticle infiltrated adhesives in varying embodiments.
Figure 5:
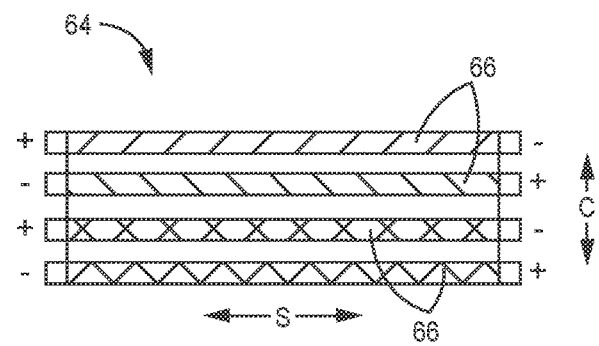
Figure 6:
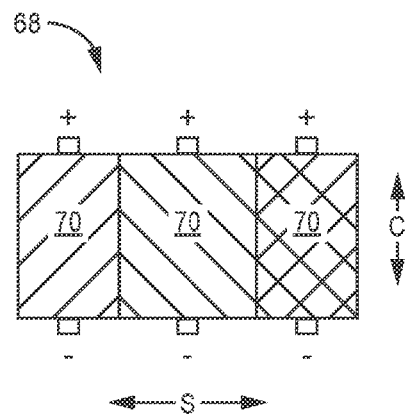

FIGS. 4-6 are schematic diagrams of nanoparticle infiltrated adhesives in varying electrical configurations.

FIG. 4 shows a particle infiltrated adhesive 60 having one large particle section 62. Here, the adhesive is one piece, all of which is evenly infiltrated with nanoparticles. In contrast, FIGS. 5 and 6 show adhesive with multiple sections or pieces, each section infiltrated with nanoparticles. FIG. 5 shows section 64 numerous spanwise (S) zones 66, each having adhesive and nanoparticles. The spanwise nanoparticle infiltrated adhesive 66 can all contain the same amount of nanoparticles, or differ depending on the typical needs for adhesive removal or replacement. Similarly, FIG. 6 shows nanoparticle infiltrated adhesive 68 with chordwise (C) sections 70. Each section 70 can contain the same amount of nanoparticles, or differing amounts.

In each of the embodiments discussed with reference to FIGS. 4-6, an electrical current can be applied to the nanoparticle infiltrated adhesive at the terminals (+, −) to align the nanoparticles within the adhesive. Because nanoparticles are electrically conductive, application of current through the nanoparticle infiltrated adhesive heats the adhesive and allows for softening or melting.

The resistivity of a given nanoparticle layer is dependent on the Equation below, where V is Voltage, R is resistance, and P is heat:

$$V^2/R=P$$

The zones of nanoparticles in FIGS. 4-6 can be smaller zones dependent on the power/voltage source used. When the power/voltage source runs current through the nanoparticles via the + and − terminals, the nanoparticles conduct the current along the adhesive. Thus, the power/voltage source can allows for an increase in temperature along the adhesive. This in turn softens or melts the adhesive, allowing for easy removal of adhesive sections containing nanoparticles. In the case of smaller sections, as in FIGS. 5, 6, each section of nanoparticle infiltrated adhesive would them be removed by peeling, pulling, or scraping. This additionally allows for tailoring to adhesive removal: only section which need to be removed for repair or replacement need to be heated and removed.

The disclosed ice protection assembly requires less drying time compared to traditional liquid or chemical adhesives. Additionally, the microwave responsive particles or micron particles or nanoparticles or mix of both, such as ferrous nanoparticle filled adhesive is easier to de-bond when ice protection device is needed to removed or reposition. Overall, removal time and effort is reduced because of the meltable nature of ferrous nanoparticle filled adhesives. Solvents, or other adhesive removal steps, are avoided. Additionally, ferrous nanoparticles strengthen adhesives in which they are loaded.

DISCUSSION OF POSSIBLE EMBODIMENTS

The following are non-exclusive descriptions of possible embodiments of the present invention.

A method of preparing an adhesive comprising infiltrating the adhesive with nanoparticles, wherein the nanoparticles re ferrous particles.

The method of the preceding paragraph can optionally include, additionally and/or alternatively, any one or more of the following features, configurations and/or additional components:

Infiltrating the adhesive comprises mixing nanoparticles into the adhesive.

The nanoparticles are electrically conductive nanowires.

The adhesive comprises a pressure sensitive adhesive selected from the group consisting of include acrylates, silicones, nitriles, and styrenes.

The adhesive is a thermoplastic adhesive selected from the group consisting of ethylene vinyl acetates, polyolefins, polycarbonates, acrylonitrile butadiene styrenes, and polyurethane hot melt adhesives.

The nanoparticles are no more than 25% by volume of the adhesive.

A method of making an ice protection assembly for an aircraft component includes providing an aircraft component having a surface, applying an adhesive on the surface of the aircraft component, wherein the adhesive is loaded with ferrous nanoparticles, and attaching, by the adhesive, a heater attached to the aircraft component.

The method of making an ice protection assembly of the preceding paragraph can optionally include, additionally and/or alternatively, any one or more of the following features, configurations and/or additional components:

The aircraft component is selected from the group consisting of an airfoils, nacelles, nosecones, engine cowls, and leading edges.

The nanoparticles are electrically conductive nanowires.

The adhesive comprises a pressure sensitive adhesive selected from the group consisting of include acrylates, silicones, nitriles, and styrenes.

The adhesive is a thermoplastic adhesive selected from the group consisting of ethylene vinyl acetates, polyolefins, polycarbonates, acrylonitrile butadiene styrenes, and polyurethane hot melt adhesives.

The nanoparticles are no more than 25% by volume of the adhesive.

The method further includes applying a primer on the surface of the aircraft component, wherein the primer is configured to increase adhesion of the adhesive on the surface.

A method of removing an adhesive from a component includes, running radiation through the adhesive so that nanoparticles in the adhesive heat and soften the adhesive, and removing the softened adhesive. The nanoparticles are ferrous particles.

The method of the preceding paragraph can optionally include, additionally and/or alternatively, any one or more of the following features, configurations and/or additional components:

The radiation is microwave or RF radiation.

The ferrous nanoparticles comprise no more than 25% by volume of the adhesive.

Removing the softened adhesive comprises scrapping, pulling, or peeling the adhesive off the component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of preparing an adhesive for aircraft deicer applications comprising infiltrating the adhesive with nanoparticles, wherein the nanoparticles are ferrous particles, wherein the adhesive is selected to a provide high frequency storage modulus (G') of greater then 30 kPa and a high frequency loss modulus (G") of greater then 32 kPa over a service temperature range of −40° C. (−40° F.) to 71° C. (160° F.), wherein the high frequency storage modulus (G') and the high frequency loss modulus (G") are measured at an angular frequency of 100 rad/s.

2. The method of claim 1, wherein infiltrating the adhesive comprises mixing nanoparticles into the adhesive.

3. The method of claim 1, wherein the nanoparticles are electrically conductive nanowires.

4. The method of claim 1, wherein the adhesive comprises a pressure sensitive adhesive selected from the group consisting of include acrylates, silicones, nitriles, and styrenes.

5. The method of claim 1, wherein the adhesive is a thermoplastic adhesive selected from the group consisting of ethylene vinyl acetates, polyolefins, polycarbonates, acrylonitrile butadiene styrenes, and polyurethane hot melt adhesives.

6. The method of claim 1, wherein the nanoparticles are no more than 25% by volume of the adhesive.

7. A method of making an ice protection assembly for an aircraft component, the method comprising:
provided an aircraft component having a surface;
applying an adhesive on the surface of the aircraft component, wherein the adhesive is loaded with nanoparticles, wherein the nanoparticles are ferrous particles; and
attaching, by the adhesive a heater attached to the aircraft component.

8. The method of claim 7, wherein the aircraft component is selected from the group consisting of an airfoils, nacelles, nosecones, engine cowls, and leading edges.

9. The method of claim 7, wherein the nanoparticles are electrically conductive nanowires.

10. The method of claim 7, wherein the adhesive comprises a pressure sensitive adhesive selected from the group consisting of include acrylates, silicones, nitriles, and styrenes.

11. The method of claim 7, wherein the adhesive is a thermoplastic adhesive selected from the group consisting of ethylene vinyl acetates, polyolefins, polycarbonates, acrylonitrile butadiene styrenes, and polyurethane hot melt adhesives.

12. The method of claim 7, wherein the nanoparticles are no more than 25% by volume of the adhesive.

13. The method of claim 7, further comprising applying a primer on the surface of the aircraft component, wherein the primer is configured to increase adhesion of the adhesive on the surface.

14. A method of removing an adhesive from a component comprising:
running radiation through the adhesive so that nanoparticles in the adhesive heat and soften the adhesive, wherein the nanoparticles are ferrous particles; and
subsequently removing the softened adhesive;
wherein the component is a heater attached, with the adhesive, to an aircraft component; and
wherein the adhesive is selected to provide a high frequency storage modulus (G') of greater then 30 kPa and a high frequency loss modulus (G") of greater then 32 kPa over a service temperature range of −40° C. (−40° F.) to 71° C. (160° F.)) , wherein the high frequency storage modulus (G') and the high frequency loss modulus (G") are measured at an angular frequency of 100 rad/s.

15. The method of claim 14, wherein the radiation comprises RF or microwave radiation.

16. The method of claim 14, wherein the nanoparticles comprise no more than 25% by volume of the adhesive.

17. The method of claim 14, wherein removing the softened adhesive comprises scrapping, pulling, or peeling the adhesive off the component.

18. A method of claim 1, wherein the adhesive is selected to provide high frequency storage modulus (G') of greater then 130 kPa and a high frequency loss modulus (G") of greater then 32 kPa over a service temperature range of −40° C.(−40° F.) to 71° C. (160° F.).

19. A method of claim 14, wherein the adhesive is selected to provide high frequency storage modulus (G') of greater then 130 kPa and a high frequency loss modulus (G") of greater then 32 kPa over a service temperature range of −40° C.(−40° F.) to 71° C. (160° F.).

20. The method of claim 14, wherein the wherein the aircraft component is selected from the group consisting of an airfoils, nacelles, nosecones, engine cowls, and leading edges.

* * * * *